(12) United States Patent
Bauer et al.

(10) Patent No.: US 8,702,038 B2
(45) Date of Patent: Apr. 22, 2014

(54) PRESSURE FUSELAGE OF AN AIRCRAFT OR SPACECRAFT WITH PRESSURE CALOTTE

(75) Inventors: Richard Bauer, Hamburg (DE); Pierre Zahlen, Stade (DE)

(73) Assignee: Airbus Operations GmbH, Hamburg (DE)

( * ) Notice: Subject to any disclaimer, the term of this patent is extended or adjusted under 35 U.S.C. 154(b) by 188 days.

(21) Appl. No.: 12/845,012

(22) Filed: Jul. 28, 2010

(65) Prior Publication Data
US 2011/0024563 A1 Feb. 3, 2011

Related U.S. Application Data

(60) Provisional application No. 61/229,538, filed on Jul. 29, 2009.

(30) Foreign Application Priority Data

Jul. 29, 2009 (DE) .......................... 10 2009 035 265

(51) Int. Cl.
*B64C 1/10* (2006.01)
(52) U.S. Cl.
USPC .............................. 244/120; 244/131; 52/846
(58) Field of Classification Search
USPC ..................... 244/117 R, 119, 120, 121, 131; 220/4.12–4.15, 560.11; 52/790.1, 52/798.1, 845, 846
See application file for complete search history.

(56) References Cited

U.S. PATENT DOCUMENTS

| 2,420,228 | A | * | 5/1947 | Condon ......................... 405/286 |
| 5,062,589 | A | * | 11/1991 | Roth et al. ................. 244/117 R |
| 5,934,616 | A | | 8/1999 | Reimers et al. |
| 6,042,055 | A | * | 3/2000 | Messinger .................... 244/131 |
| 6,378,805 | B1 | * | 4/2002 | Stephan et al. ............... 244/119 |
| 2008/0179459 | A1 | * | 7/2008 | Garcia Laja et al. ......... 244/119 |

FOREIGN PATENT DOCUMENTS

| DE | 1214091 B | 4/1966 |
| DE | 102006027707 A1 | 12/2007 |
| DE | 102007052140 A1 | 5/2009 |
| EP | 0847916 A2 | 6/1998 |

* cited by examiner

*Primary Examiner* — Joseph W Sanderson
*Assistant Examiner* — Timothy Schwarz
(74) *Attorney, Agent, or Firm* — Leydig, Voit & Mayer, Ltd.

(57) ABSTRACT

A pressure fuselage of an aircraft or a spacecraft includes at least two fuselage sections disposed longitudinally along the fuselage; at least one pressure calotte disposed in the fuselage so as to form a pressurized area; and an arcuate frame profile having a Y-shaped cross-section with a long profile leg connected to at least one of the at least two fuselage sections and a short profile leg extending at an acute angle from the long profile leg toward an inside of the at least two fuselage sections and attached to the at least one pressure calotte.

9 Claims, 2 Drawing Sheets

PRESSURE FUSELAGE OF AN AIRCRAFT OR SPACECRAFT WITH PRESSURE CALOTTE

CROSS REFERENCE TO PRIOR APPLICATIONS

Priority is claimed to German Application No. DE 10 2009 035 265.1, filed Jul. 29, 2009 and U.S. Provisional Application No. 61/229,538, filed Jul. 29, 2009. The entire disclosure of both applications is incorporated by reference herein.

FIELD

The present invention relates to a pressure fuselage of an aircraft or a spacecraft composed of a plurality of fuselage sections in the longitudinal extension direction, wherein at least one pressure calotte is integrated to form a pressurized cabin, having an arcuate frame profile and at least one fuselage section for its internal attachment. In particular, the present invention relates to a civil aircraft for the transportation of people and/or goods, which has such a pressure fuselage.

The field of use of the present invention extends primarily to civil aircraft technology. For the transport of primarily people or goods, civil aircraft with a large-volume fuselage are used, which can be subdivided into a plurality of planes. The fuselage of such aircraft is usually built in a shell construction, which forms the load-bearing structure. In these fuselage shells, longitudinally-acting forces and torsional forces acting transverse to the longitudinal direction in the circumferential direction, are caused by the wings, the engines and the horizontal and vertical tailplanes, amongst others. The high mechanical rigidity of the outer hull with respect to the forces acting on it results from the essentially tubular elongate structure of the fuselage. Within the shell structure, longitudinally extending stringers and frames extending transverse to the stringers and corresponding to the cross-section of the fuselage are provided. The stringers and frames prevent dents and the like from forming in the outer shell, which could reduce the mechanical strength of the outer shell with respect to longitudinal, transverse and torsional forces.

For transport at high altitudes it is crucial for the survival of humans, in particular, present in the aircraft fuselage that atmospheric pressure is maintained. For this purpose, the fuselage is provided with a pressurized area for people. Usually, the freight hold of an aircraft is also pressurized at atmospheric pressure. Machinery and the like is usually arranged outside of the pressurized area of the fuselage. A fuselage of this type will be referred to as a pressure fuselage in the context of the present invention.

BACKGROUND

DE 10 2006 027 707 A1 discloses a pressure fuselage of a generic aircraft or spacecraft. In the area of the tail portion of the pressure fuselage, the pressurized area—the cabin—transitions to a non-pressurized area. In this area, the load-bearing outer shell is supported by interior longitudinally extending stringers and by frames arranged transversely thereto. The frames have a shape corresponding to the cross-section of the outer shell. This skeleton formed by the stringers and the frames has no or only little mechanical strength. It is only after the addition of the outer shell that this section of the fuselage achieves its full strength.

Due to the pressure difference between the pressure fuselage and the non-pressurized tail area, forces act in the longitudinal direction on a pressure bulkhead forming the dividing wall. For the pressure bulkhead to have sufficient mechanical stability against these forces, various struts are provided. In addition, a pressure calotte bulging toward the outside in the direction of the non-pressurized tail area is integrated in the pressure bulkhead. The connection between the edge area of the bulging pressure calotte with the adjacent frame must be pressure tight and have sufficient strength to withstand any arising stresses.

A drawback of this prior art is the rather laborious connection with the various struts.

DE 10 2007 052 140 A 1 discloses a different technical solution for the attachment of a pressure calotte within a pressure fuselage of an aircraft or a spacecraft. The fuselage structure has an annular main segment, which includes a cross-sectional opening that is closed by means of a pressure calotte. A plurality of ties connect the pressure calotte with the annular main segment and thus bear the loads acting on the pressure calotte as tensional forces. Reinforcing elements bearing bending stresses can thus be avoided by this technical approach. The ties may thus be made with smaller cross-sections resulting in an economy of weight.

However, further components are necessary to create a pressure-tight connection of the pressure calotte with the adjacent fuselage section, in particular U-shaped arcuate annular frames with special bending radii which must be stably attached to the fuselage section by means of supporting brackets.

A great number of individual connecting and supporting elements is necessary overall, which each have to be individually assembled.

SUMMARY OF THE INVENTION

An aspect of the present invention is to provide a pressure fuselage of an aircraft or a spacecraft wherein the pressure calotte can be assembled with few simple attachment elements in a secure and time-saving manner.

The invention includes the technical teaching that the frame profile has a Y-shaped cross-section for the attachment of the pressure calotte on the inside of the associated fuselage section, with a long profile leg for connection on at least one fuselage section and a short profile leg extending at an acute angle $\alpha$ from a central region toward the inside to establish a connection with the pressure calotte.

In other words, the frame profile according to the present invention serves as a connection for the pressure calotte, with which it can be connected to the hull, i.e. the outer shell of the pressure fuselage in the area of the associated fuselage section.

The advantage of the approach according to the present invention is in particular that the frame profile with the special Y-shaped cross-section offers all required connections to the adjacent components and has great structural strength due to its shape. The frame profile according to the present invention is thus a simple component with integrated connection for the pressure calotte.

According to a measure improving upon the present invention it is suggested to also connect two adjacent fuselage sections by their edge areas with the long profile leg acting as a bridge thus achieving functional integration at the same time as the connection of the pressure calotte. If a joint between adjacent fuselage sections is planned at the position of the frame profile, the connection of these adjacent fuselage sections can also be carried out by means of the frame profile. Additional struts and the like can thus be omitted.

Advantageously, the connection of the two adjacent fuselage sections should be carried out by riveting them on the long profile leg of the frame profile. In the same manner and thus simple from an assembly point of view, the connection between the short profile leg and the pressure calotte should also be carried out by means of riveting. Depending on the stresses envisaged, a plurality of rows of rivets should be used as necessary.

To enable a statically advantageous straight-line transition between the pressure calotte and the short profile leg of the frame profile it is suggested that the acute angle α should correspond to about half of the calotte angle. The short profile leg and the pressure calotte adjacent to it in the connection area are thus subject mainly to tensile stress when the cabin is pressurized.

The frame profile of the present invention having the special Y-shaped cross-section can be manufactured according to the following two preferred alternatives:

According to a first alternative it is recommended to manufacture the frame profile as an integral formed part of fiber composite material. The frame profile of fiber composite material can thus be provided as a fiber-plastic composite of carbon fibers and a synthetic resin as the matrix. This can be manufactured, for example, using the manufacturing method of laminating with the aid of a suitable mould.

If an additional reinforcement of the frame profile thus manufactured should be necessary, a U-shaped arcuate stiffening element of fiber-composite material or metal can be inserted in the area of the acute angle α, which is connected to the leg sections of the frame profile in contact therewith by means of lamination on top or between layers or by means of riveting or the like. The U-shaped stiffening element is arcuate in its longitudinal extension so that it follows the arcuate shape of the frame profile. The bottom area closed off by the two legs of the U-shaped stiffening element should be arranged in the frame profile at a sufficient distance from the apex of the acute angle α to ensure that the desired stiffening effect is achieved. The U-shaped stiffening element can be made as a milled metal part or of metal sheeting shaped in the desired contour by means of bending.

According to the second preferred alternative, it is suggested to form the frame profile as an integral formed part made of a metal or metal alloy as a milled or forged part.

If additional stiffening means should be necessary with such a metallic frame profile, it is suggested that they be integrated preferably directly into the frame profile, by providing circumferentially-spaced radially-extending stiffening elements integrally formed with the latter in the area of the acute angle α. These can be integrally cast directly during the manufacture of the metallic frame profile so that an integral component results.

BRIEF DESCRIPTION OF THE DRAWINGS

Further measures improving upon the invention will be described in the following in more detail together with the description of a preferred exemplary embodiment of the invention with reference to the drawings, wherein.

DETAILED DESCRIPTION

Figure 1:
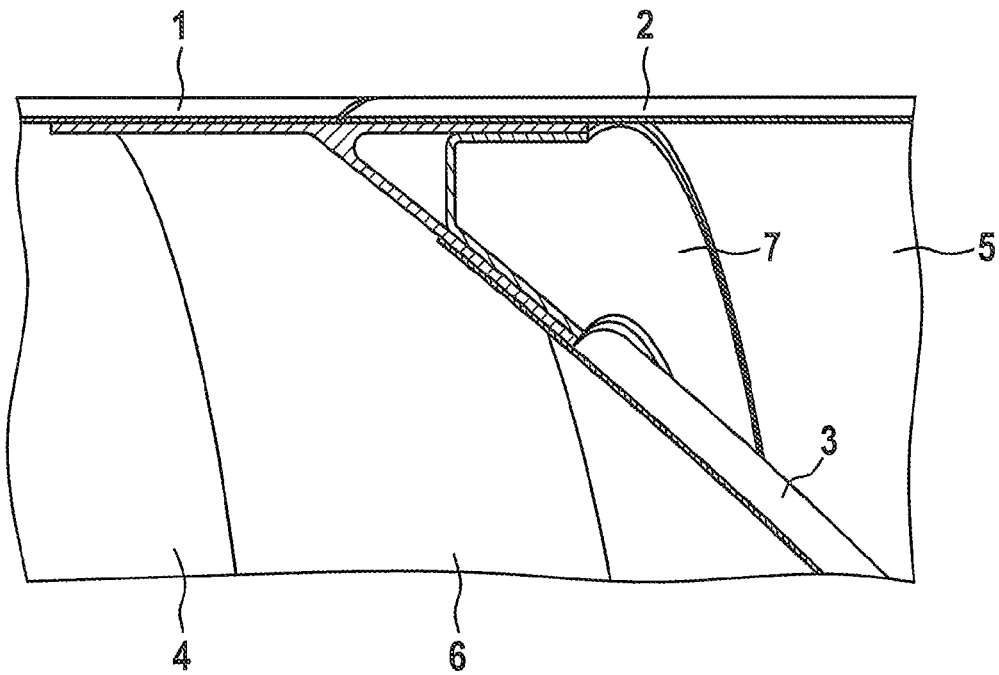
FIG. 1 is a perspective view of a first embodiment of a frame profile in place in a pressure fuselage.

With reference to FIG. 1, the pressure fuselage of a civil aircraft only shown here as a small portion of the tail area consists of two adjacent fuselage sections 1 and 2, wherein a pressure calotte 3 is mounted on the inside subdividing the pressure fuselage into a pressurized area 4 and a non-pressurized tail area 5 situated on the other side. For the pressure-tight assembly of pressure calotte 3 with respect to the two adjacent fuselage sections 1 and 2, an arcuate frame profile 6 is connected on the inside with the adjacent components.

Arcuate frame profile 6 has a Y-shaped cross-section and cooperates with a U-shaped arcuate stiffening element 7 of metal inserted from the tail area 5.

Figure 2:
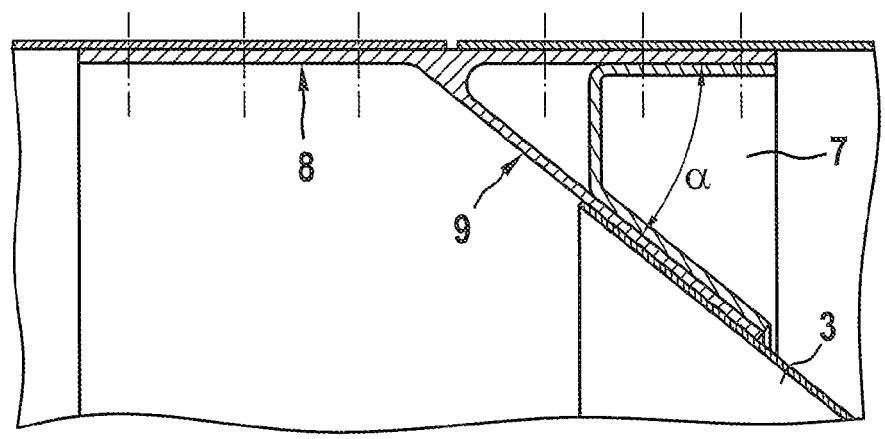
FIG. 2 is a longitudinal sectional view in the area of the frame profile according to FIG. 1 with a riveting scheme.

With reference to FIG. 2, the U-shaped arcuate stiffening element 7 is inserted in an acute angle α formed between the long profile leg 8 and a short profile leg 9 formed on the latter and extending from it. In this exemplary embodiment, the two adjacent fuselage sections 1 and 2 are connected by means of the long profile leg 8 of the frame profile 6, in the present case by means of riveting (parallel dot-dashed lines). The edge areas of pressure calotte 3 are connected in the same manner to the short profile leg 9 of frame profile 6 by means of riveting, whereby the U-shaped arcuate stiffening angle 7 is also attached.

Frame profile 6 as well as stiffening means 7 are of a fiber composite material in the present exemplary embodiment and are an integral component made by means of forming.

Figure 3:
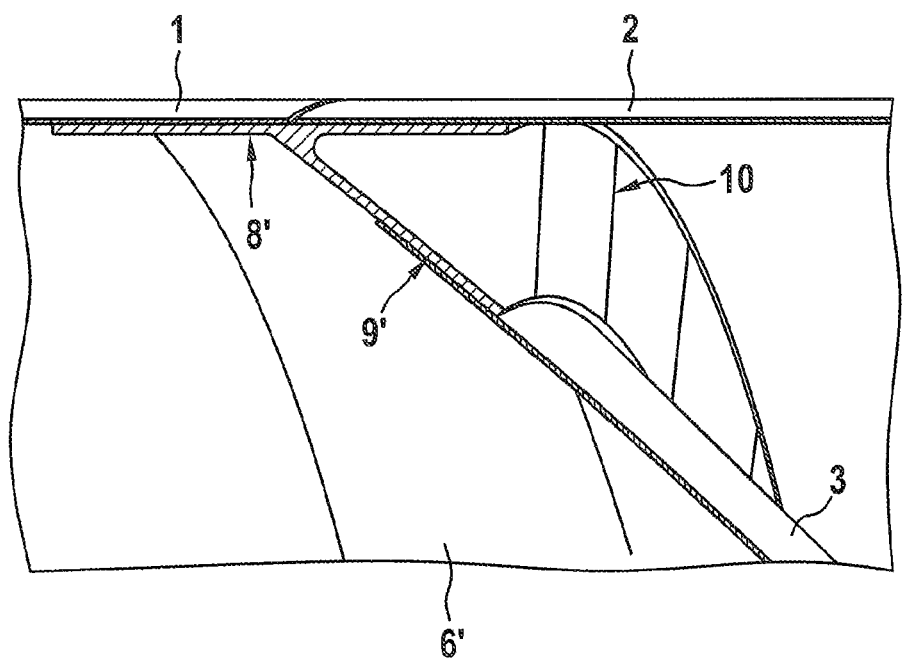
FIG. 3 is a perspective view of a second embodiment of a frame profile in place in a pressure fuselage.

With reference to FIG. 3, frame profile 6' is made as a metal part, in the present case of an aluminum alloy. A plurality of circumferentially-spaced radially-extending strips 10 are integrally cast together with the required long profile leg 8' and the short profile leg 9' extending therefrom.

Figure 4:
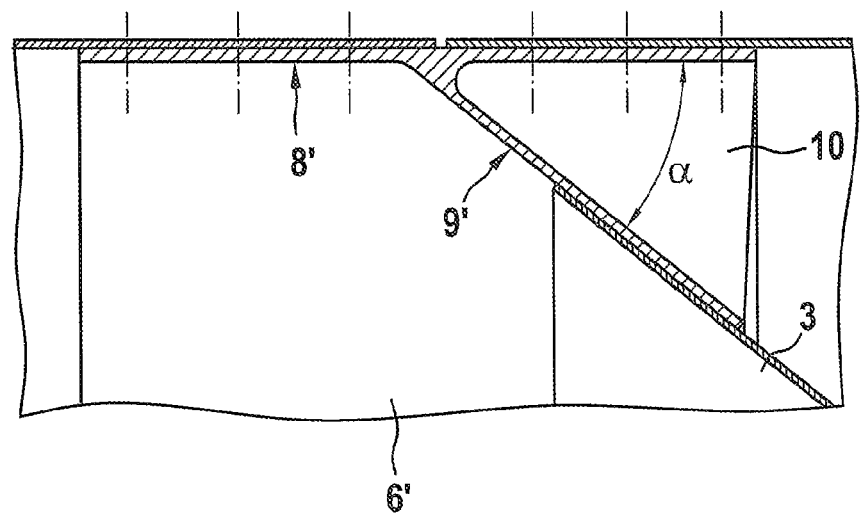
FIG. 4 is a longitudinal sectional view in the area of the frame profile according to FIG. 3 with a riveting scheme.

With reference to FIG. 4, strips 10 cover the entire area of angle α between long profile leg 8' and short profile leg 9'. All components to be connected are again riveted (parallel dot-dashed lines).

In addition it should he noted that "comprising" does not exclude other elements or steps and that "a" or "an" does not exclude a plurality. Furthermore it should be noted that features or steps described with reference to one of the above exemplary embodiments can also be used in combination with other features or steps of other above-described exemplary embodiments. Reference numerals in the claims should not he construed as limiting.

List of Reference Numerals
1 first fuselage section
2 second fuselage section
3 pressure calotte
4 pressurized area
5 tail area
6 frame profile
7 stiffening element
8 long profile leg
9 short profile leg
10 strip

What is claimed is:

1. A pressure fuselage of an aircraft or a spacecraft having a longitudinal axis and comprising:
    at least two fuselage sections disposed along the longitudinal axis of the fuselage;
    at least one pressure calotte disposed in the fuselage so as to form a pressurized area; and
    an arcuate frame profile including:
        a Y-shaped cross-section with a long profile leg that has a length and is connected to at least one of the at least two fuselage sections and a short profile leg that has a length less than the length of the long profile leg and that extends at an acute angle from the long profile leg toward an inside of the at least two fuselage sections and attached to the at least one pressure calotte, and at least one U-shaped arcuate stiffening element disposed at least partially within the acute angle, the at least one U-shaped arcuate stiffening element including a first leg connected to the long profile leg and a second leg connected to the short profile leg.

2. The pressure fuselage as recited in claim 1, wherein the at least two adjacent fuselage sections each include an edge area, the long profile leg connecting each of the edge areas.

3. The pressure fuselage as recited in claim 2, wherein the at least two adjacent fuselage sections are riveted to the long profile leg.

4. The pressure fuselage as recited in claim 1, wherein the acute angle corresponds to half of an angle of the calotte such that a straight-line transition occurs between the calotte and the short profile leg.

5. The pressure fuselage as recited in claim 4, wherein an edge area of the pressure calotte is riveted to the short profile leg.

6. The pressure fuselage as recited in claim 1, wherein the frame profile includes a fiber composite material.

7. The pressure fuselage as recited in claim 1, wherein the frame profile includes one of a metal and a metal alloy.

8. The pressure fuselage as recited in claim 7, wherein the frame profile includes formed strips circumferentially spaced and radially extending in an area of the acute angle.

9. A civil aircraft for transportation of at least one of people and goods at high altitudes comprising:
a pressure fuselage having a longitudinal axis and including at least two fuselage sections disposed along the longitudinal axis of the fuselage; at least one pressure calotte disposed in the pressure fuselage so as to form a pressurized area; and an arcuate frame profile including:
a Y-shaped cross-section with a long profile leg that has a length and is connected to at least one of the at least two fuselage sections and a short profile leg that has a length less than the length of the long profile leg and that extends at an acute angle from the long profile and configured to attach the pressure calotte on an inside of at least one of the at least two fuselage sections, and
at least one U-shaped arcuate stiffening element disposed at least partially within the acute angle, the at least one U-shaped arcuate stiffening element including a first leg connected to the long profile leg and a second leg connected to the short profile leg.

* * * * *